United States Patent
Yeung

(10) Patent No.: US 6,966,356 B2
(45) Date of Patent: *Nov. 22, 2005

(54) AIR-VENTILATOR WITH HIGH EFFICIENCY THERMAL EXCHANGER AND AIR FILTER

(75) Inventor: Kui Wong Yeung, Kwai Chung (HK)

(73) Assignee: Housely Industries, Inc., (CN)

( * ) Notice: Subject to any disclaimer, the term of this patent is extended or adjusted under 35 U.S.C. 154(b) by 0 days.

This patent is subject to a terminal disclaimer.

(21) Appl. No.: 10/713,056

(22) Filed: Nov. 17, 2003

(65) Prior Publication Data

US 2004/0104008 A1 Jun. 3, 2004

Related U.S. Application Data

(63) Continuation of application No. 09/960,387, filed on Sep. 24, 2001, now Pat. No. 6,684,939.

(30) Foreign Application Priority Data

Sep. 20, 2001 (HK) .................. 01106671

(51) Int. Cl.$^7$ .............................. F24F 1/00; F24F 7/08; F24F 7/007
(52) U.S. Cl. .................. 165/54; 165/122; 165/119; 165/166; 165/135
(58) Field of Search .................. 165/54, 122, 119, 165/166, 135

(56) References Cited

U.S. PATENT DOCUMENTS

| | | | |
|---|---|---|---|
| 4,099,928 A | 7/1978 | Norback | |
| 4,125,153 A | 11/1978 | Stoneberg | |
| 4,231,133 A * | 11/1980 | Probost | 15/422.2 |
| 4,377,400 A | 3/1983 | Okamoto et al. | |
| 4,429,735 A | 2/1984 | Nomaguchi et al. | |
| 4,513,809 A | 4/1985 | Schneider et al. | |
| 4,550,773 A * | 11/1985 | Martin | 165/54 |
| 4,557,321 A * | 12/1985 | von Resch | 165/54 |
| 4,655,278 A | 4/1987 | Seguin | |
| 4,874,042 A | 10/1989 | Becker | |
| 4,971,137 A | 11/1990 | Thompson | |
| 5,070,934 A | 12/1991 | Kucharczyk | |
| RE33,912 E | 5/1992 | Lapkowski | |
| 5,238,052 A | 8/1993 | Chagnot | |
| 5,490,557 A * | 2/1996 | Taylor | 165/54 |
| 5,761,908 A | 6/1998 | Oas et al. | |

(Continued)

FOREIGN PATENT DOCUMENTS

EP 226807 A * 7/1987 ............ B60H 1/00

(Continued)

OTHER PUBLICATIONS

ASHRAE Handbook, 1983 Equipment Volume, pp. 3.1-3.11 (1983), ASHRAE Publications, Atlanta, Georgia.

*Primary Examiner*—John K. Ford
(74) *Attorney, Agent, or Firm*—Buchanan Ingersoll PC

(57) ABSTRACT

A compact air-ventilator with high efficiency thermal exchanger and air filter in which the thermal exchanger utilize a light-weight assembly of parallelly stacked thin metallic plates with pre-formed spaces. The high efficiency air filter includes a combination of filter elements including a mesh grid, an activated carbon layer and a HEPA filter. This air-ventilator can be built-in as part of an air-conditioner or as a stand alone unit to provide additional air circulating to conventional air-conditioners to improve indoor air quality. The thermal exchanger as well as the filters can be made with modular design to allow for easy periodic maintenance and replacement.

4 Claims, 5 Drawing Sheets

U.S. PATENT DOCUMENTS

| | | |
|---|---|---|
| 6,156,089 A | 12/2000 | Stemmer et al. |
| 6,345,510 B1 | 2/2002 | Shiuan |
| 6,684,939 B2 * | 2/2004 | Yeung .......................... 165/54 |
| 2004/0104008 A1 * | 6/2004 | Yeung .......................... 165/54 |

FOREIGN PATENT DOCUMENTS

| | | | | |
|---|---|---|---|---|
| EP | 0855560 | 7/1998 | | |
| EP | 0942237 | 9/1999 | | |
| GB | 2222875 | 3/1990 | | |
| JP | 59-145431 | 8/1984 | | |
| JP | 62-293032 | 12/1987 | | |
| JP | 1-123929 | 5/1989 | | |
| JP | 2-75840 | 3/1990 | | |
| JP | 02063519 A * | 3/1990 | ......... B01D 46/44 | |
| JP | 3-28636 | 2/1991 | | |
| JP | 3-87534 | 4/1991 | | |
| JP | 5-79658 | 3/1993 | | |
| JP | 5-106883 | 4/1993 | | |
| JP | 5-141699 | 6/1993 | | |
| JP | 8-5091 | 1/1996 | | |
| JP | 8-54131 | 2/1996 | | |
| JP | 8-224431 | 9/1996 | | |
| JP | 09004868 A * | 1/1997 | ............. F24F 1/00 | |
| JP | 11-169634 | 6/1999 | | |
| JP | 2001-116314 | 4/2001 | | |
| JP | 2001-157807 | 6/2001 | | |
| WO | 99/60307 | 11/1999 | | |

* cited by examiner

Air inlet ⟶
Air outlet ⇢

AIR-VENTILATOR WITH HIGH EFFICIENCY THERMAL EXCHANGER AND AIR FILTER

This application is a continuation of application Ser. No. 09/960,387, filed Sep. 24, 2001, which claims the priority of Hong Kong Patent Application No. 01106671.2, filed Sep. 20, 2001, the entire contents of which are hereby incorporated by reference.

FIELD OF THE INVENTION

The present invention relates to an air-ventilating device, apparatus, system and/or installation. More particularly, this invention relates to an air-ventilating device, apparatus, system and installation having a thermal exchanger and an air filter. More specifically, this invention relates to an air-ventilating device, apparatus, system and/or installation which can be used in or with residential and commercial heating, cooling and air-conditioning systems or installations. This invention also relates to air conditioners having a built-in thermal exchanger and a high efficiency air filter.

BACKGROUND OF THE INVENTION

In this specification, the term "air-conditioners" generally and collectively means air heating, cooling and conditioning devices, apparatuses, systems and installations for succinctness unless the context requires otherwise. Likewise, the term "air-ventilators" generally and collectively means air-ventilating or air-circulating means, devices, systems or installations for succinctness, unless the context otherwise requires.

Air-conditioners are widely used to provide a comfortable indoor environment for occupants of residential, commercial or public buildings, premises or other enclosed spaces such as offices, schools, cinemas, theatres, halls, and other similar places. Air-ventilators are always used in or with air-conditioners so that indoor air, which may contain a lot of harmful gases, can be constantly and regularly replaced with out-door air supply which generally has a higher oxygen content and a lower harmful gas content. Typical harmful gases found in enclosed buildings, especially crowded buildings, include carbon-dioxide, carbon-monoxide, unpleasant odors, irritants such as formaldehyde in the building materials and the radioactive radon gas released from granite.

On the other hand, although out-door air generally has a higher oxygen content, it is not without pollutants and air-pollution is especially bad in urban built-up areas. Typical pollutants found in out-door air include particulate pollutants such as dusts, ashes, smoke particles, particles from incomplete combustion of diesel fuel, pollens, odors, acid or other chemical gases, and bacterial organisms.

In order to block, or at least minimise, the entrance of harmful substances into an enclosed indoor space to provide a healthier indoor environment, air-ventilators of air-conditioners are usually provided with air filters at the "fresh-air" intake ports. The air filters are usually simple mesh filters, although the more sophisticated filters such as activated carbon filters, polymeric foam filters, glass fiber filters and biostat filters such as those containing potassium permanganate are useful alternatives or additions. In some applications, high-efficiency particulate air (HEPA) filters which are known to be effective to remove up to 99.7% of air-borne particles of the size of 0.3 microns or larger, can be used. Some air filters for use in air-ventilators may include one or more types of filtering materials and designs in order to optimally removed different types of harmful substances from the supply air.

Since the conditioned indoor air which is to be exhausted contains thermal energy which can be re-used, heat exchangers which provide means for transferring thermal energy between the in-coming and the out-going air streams are known to have been used in air-ventilators. Examples of such ventilators are described in the following U.S. patents: U.S. Pat. No. 5,238,052, U.S. Pat. No. 4,874,042, U.S. Pat. No. 4,377,400. Heat exchangers are utilized to recover thermal energy from the out-going air stream to reduce wasted thermal energy discharge from the exhaust air. This recouperation of energy is beneficial for the protection of the environment, as well as imposing a lesser load demand on the air-conditioners and, at the same time, reducing the operating and running costs of air-conditioners. Such benefits are achievable because it is known that thermal exchange between a cold air stream and a hot air stream will reduce the total energy requirement for conditioning the in-coming air stream. Thus, for an air-cooling system, the in-coming air stream is cooled by the out-going exhaust air before the exhaust air leaves the air-conditioner. Similarly, for an air-heating system, the out-going warm air is used to warm up the in-coming out-door air before it enters a building.

In light of the afore-mentioned requirements for contemporary air-conditioners, it is highly beneficial and desirable that air-conditioners incorporating thermal exchangers as well as highly efficient air filters are provided. However, it has been observed that conventional air-conditioners of this description do not have a high thermal efficiency, especially after pro-longed use. Hence, it is desirable that air-conditioners with air-ventilators having highly efficient air filters which at the same time has a high thermal efficiency and a stable performance can be provided.

Furthermore, while air-conditioners are widely used in many crowded places such as schools to provide a better indoor environment, their performance in the exchanging of stale indoor with fresh out-door air is not entirely satisfactory. In fact, there have been reports that the indoor carbon-dioxide concentration in many air-conditioned schools exceeds the generally acceptable level of 800 ppm by as much as 35%. Hence, it is desirable that highly thermal efficient air-ventilators can be installed to supplement the supply of out-door air into the enclosed indoor space without substantially increasing energy costs or wasted energy.

It is therefore desirable to provide air-ventilators with high efficiency air filters which operate with high thermal efficiency and low running costs so that the environment can be protected, wasted heat as well as energy costs can be reduced. As space is precious in the city, it is also desirable that the improved air-ventilators can be provided in a compact design. Preferably, important components, such as the thermal exchanger unit, of the air-ventilators are of modular design for easy maintenance. In addition, while the air-ventilator can be used as a stand-alone unit, it is desirable that the improved air-ventilators can be incorporated or used in or with air-conditioners.

OBJECT OF THE INVENTION

Accordingly, it is an object of the present invention to provide an improved air-ventilator with highly effective air filters while having a high thermal efficiency. It is also an object of the present invention to provide an air-ventilator with air filters which is highly thermal efficient and compact enough for city use. It is a further object of the present invention to provide improved air-ventilators which can be incorporated into air-conditioners or can be used in or with air-conditioners to improve the air quality of conditioned indoor space while maintaining high thermal efficiency at low operating costs. Preferably, the air-ventilators are of modular design for easy maintenance. As a minimum, it is an object of the present invention to provide the public with a choice of air-ventilators or air-conditioners incorporating an improved air-ventilator which can be used to improve the quality of indoor air without substantially incurring additional energy costs.

SUMMARY OF THE INVENTION

According to the present invention, there is provided an air-ventilator including a main housing, said main housing includes a first and a second air-compartment respectively along which a first and a second air streams can flow, said air-ventilator includes first and second air-moving devices for respectively moving said first and second air streams, a thermal exchanger providing thermal exchange between said first and second air streams without mixing of said air streams, an air-filter disposed at the air-intake end of one of said air-compartments, and an additional air-moving device disposed in said air-compartment with and in series with said air-filter.

Preferably, said first and said second air-moving devices are respectively disposed in said first and said second air-compartments.

Preferably, said air-compartment with said air-filter is provided for drawing out-door air into a confined indoor space, wherein said additional serial air-moving device provides additional air drawing power.

Preferably, said additional air-moving device is disposed in said first air-compartment and intermediate between said air-filter and said first air-moving device.

Preferably, said air-filter includes the combination of a HEPA filter and an activated carbon filter.

Preferably, said first and second air-moving device are driven by a single motor.

Preferably, said thermal exchanger is disposed at the air outlets of said air-passageways.

Preferably, said first and second air-moving devices include centrifugal fans driven by a single motor.

Preferably, said additional air-moving device includes a rotary fan disposed between said filter and said thermal exchanger.

Preferably, said thermal exchanger includes a plurality of substantially parallelly stacked heat exchanging semi-rigid metallic sheets, wherein a plurality of substantially parallel running ribs and corresponding grooves are formed on said semi-rigid metal sheets.

Preferably, said semi-rigid metallic sheet includes a pair of upwardly extending and a pair of downwardly extending side walls alternately disposed on the sides of said sheets, said walls of corresponding sheets are joined and sealed to form a confined air-passageway within said thermal exchanger.

Preferably, said ribs and grooves are formed by pressing said semi-rigid metallic sheet.

According to another aspect of the present invention, there is provided an air-ventilator including a main housing, said main housing includes a first and a second enclosed air-compartments respectively along which a first and a second air streams can flow, said air-ventilator includes a first and a second air-moving devices for respectively moving said first and second air streams respectively in said first and second air-compartments, a thermal exchanger providing means for thermal exchange between said first and second air streams without mixing of said air streams, an air-filter disposed at the air-intake end of one of said first air-compartments, an additional air-moving device disposed in said first air-compartment with and in series with said air-filter, and said addition air-moving device is disposed intermediate between said air-filter and said first air-moving device.

According to yet another aspect of the present invention, there is provided an air-conditioner including an air-ventilator, said air-ventilator includes a main housing inside which there are provided a first and a second air-moving devices for respectively moving said first and second air streams along first and second air-passageway, a thermal exchanger providing thermal exchange between said first and second air streams without mixing of said air streams, an air-filter disposed at the air-intake end of one of said air-passageway, and an additional air-moving device disposed in said air-passageway with and in series with said air-filter.

According to a further aspect of the present invention, there is provided a thermal exchanger which includes a plurality of semi-rigid metallic plates for thermal exchanging between two air-streams, wherein at least some of said semi-rigid metallic plates are pressed to form ribs for supporting an adjacent plate as well as regulating air-flow. Preferably, said semi-rigid plates are substantially square.

BRIEF DESCRIPTION OF THE DRAWINGS

A preferred embodiment of the present invention will now be explained by way of example and with reference to the accompanying drawings, in which.

DETAILED DESCRIPTION OF THE PREFERRED EMBODIMENTS

Figure 1:
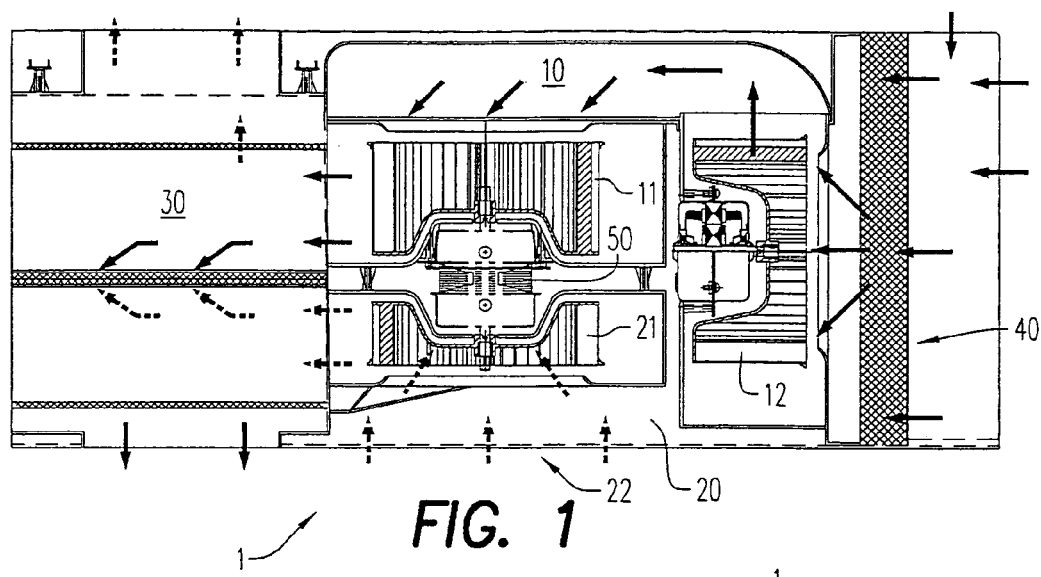
FIG. 1 shows a schematic diagram of a preferred embodiment of an air-ventilator of the present invention with different arrows showing the different directions of air flow.

Referring to FIGS. 1–4, there is illustrated a preferred embodiment of an air-ventilator of the present invention. In the Figures, different arrows indicate the different directions of air flow within the air-ventilator. The air-ventilator (1) includes a main housing (2) inside which there are formed a first (10) and a second (20) enclosed air compartments or air chambers which respectively define a first and a second separated air-passageway. In this preferred embodiment, the first air-passageway (10) (illustrated by solid arrows) provides a "fresh air" path for outside air to enter the enclosed indoor space through the air-ventilator. The second air-passageway (20) (illustrated by broken arrows) provides an exit path ("exhaust air path") for the indoor air to leave the enclosed space through the air-ventilator (1).

A thermal exchanger (30) is provided on the air-ventilator (1) at a position at which both air-passageways intersect without mixing. The thermal exchanger (30) provides means for transferring thermal energy between the in-coming and the outgoing air streams so that the total energy requirement for conditioning the air supply to the indoor space can be reduced.

Many types of heat exchangers are known. For example, the plate-type, the corrugated board type, the fin and tube-type and shell and tube-type heat exchangers. Plate-type heat exchangers are generally less complicated and more easily made and are therefore used in the present preferred embodiment for illustration purpose. Of course, other suitable types of heat exchangers can be used with suitable modifications and adaptations. The in-coming and out-going air streams are brought into thermal contact at the thermal exchanger to bring about thermal energy transfer between the two air streams before the indoor air leaves the enclosed space and the outside air enters the enclosed space.

In order to bring about forced air movement of the two air streams so that fresh air is supplied and stale air removed, air-moving devices are placed in the air-passageways. In general, rotary vane wheels, centrifugal fans, blowers, propellers are the commonly used air-moving devices although others can also be used. In this embodiment, the air-moving device (the "first air-moving device") for the fresh air path includes a rotary vane wheel or a centrifugal fan (11) placed in the first air-passageway (10) intermediate between the air-filter (40) and the thermal exchanger (30). The air-moving device (the "second air-moving device") for removing indoor air to the outside includes a similar rotary vane wheel or centrifugal fan (21) placed between the thermal exchanger (30) and the indoor air intake port (22).

In the embodiment, the first (11) and the second (21) air-moving devices are connected to the shaft of an electric motor (50) so that both air-moving devices (11, 21) are driven by the same motor for a simple and compact construction as well as minimising component costs.

To provide good quality air to be supplied into the enclosed space, an air-filter including three layers of filtering elements is provided. In this filter, the front-end of the air filter is a mesh or grid filter to keep away larger particles. The second filter layer includes an activated carbon-filter for the removal of odors, radon gas and other pollutants which can be absorbed by activated carbon. The third layer includes a high-efficiency particulate air (HEPA) filter which is known to be able to remove 99.7% of particulate pollutants of the size of 0.3 microns or larger from air. Of course, "absolute" filters or other chemical-absorptive filters can also be used in combination, in addition, or in replacement to the filter elements, especially in addition to the activated carbon.

During the development of an improved air-ventilator (1) which incorporates a high thermal efficiency thermal exchanger and a high efficiency air-filter, it was observed that, if the air-ventilator utilises a conventional construction which includes a single air-moving device placed intermediate between the air-filter and the heat exchanger in the fresh air path, the thermal efficiency declined rapidly with the time of operation and the ventilator performance is quite unstable.

Upon further studies and experiments, it was found that the substantial decline in thermal efficiency and the performance instability was at least partly due to imbalances between the volume rate of air removed and the volume rate of air replenished through the ventilator. This phenomenon is particularly observable when the air-filters become increasingly clogged by particles due to prolonged use.

When the air-filter (40) is clogged or partly clogged, there is an imbalance of the volume rate of air leaving the enclosed area and the volume rate of air being drawn into the enclosed area through the air-ventilator (1). As a result, an under-pressure area is created in the enclosed space in the vicinity of the air-ventilator. This under-pressure draws outside air into the enclosed space not via the air-ventilator but through the unsealed gaps, for example, window gaps or door gaps. As outside air is drawn directly into the enclosed space without undergoing thermal exchange and the indoor air leaves the room without optimally giving up the residual energy to the incoming outside air streams, there is a significant drop in thermal efficiency. The direct entrance of the outside air also means that some of the incoming air can by-pass the air-filters and brings in an undesirable level of harmful substances.

In order to overcome this undesirable and adverse phenomenon, the initial attempted solution was to increase the rotational speed of the air-moving device (11) in the fresh air compartment (10) in order to compensate for the loss of fresh air supply rate due to air filter clogging. It was originally attempted to attain a balance of air-flow rate between the in-coming and out-going air streams. However, the increase in rotational speed generally results in a higher noise level, especial high pitch noise, which is not acceptable for most practical or domestic applications of an air-ventilator.

After further studies and experiments, an improved configuration was devised which substantially alleviates the problems associated with the afore-mentioned prototype proposed configurations.

In this preferred embodiment incorporating the improvements, an additional air-moving device (12) is placed in the first air compartment (10) or the fresh air-passageway to compensate for the imbalances resulting from the under-pressure as a result of the difficulty in drawing outside air into the enclosed space via the air-ventilator due to filter clogging. This additional air-moving device is a centrifugal fan (12) connected to an electric motor which provides additional suction to draw air from the outside through the air-filter (40) and then delivers the air towards the first air-moving device (11) for continual delivery to the thermal exchanger (30). As the under-pressure problem is now substantially alleviated, there is no need for a high speed suction device to compensate for the increased loading due to a clogged or partly clogged filter. As a result, both air-moving devices can operate within the normal rotational speed range of 800–1,200 rpm and, at the same time, maintain a high thermal efficiency.

For a more sophisticated air-ventilator, the additional air-moving device can be micro-processor controlled with sensors monitoring the imbalance in order to provide optimal operation of the additional air-moving device in co-ordination with the other air-moving devices.

Figure 5:
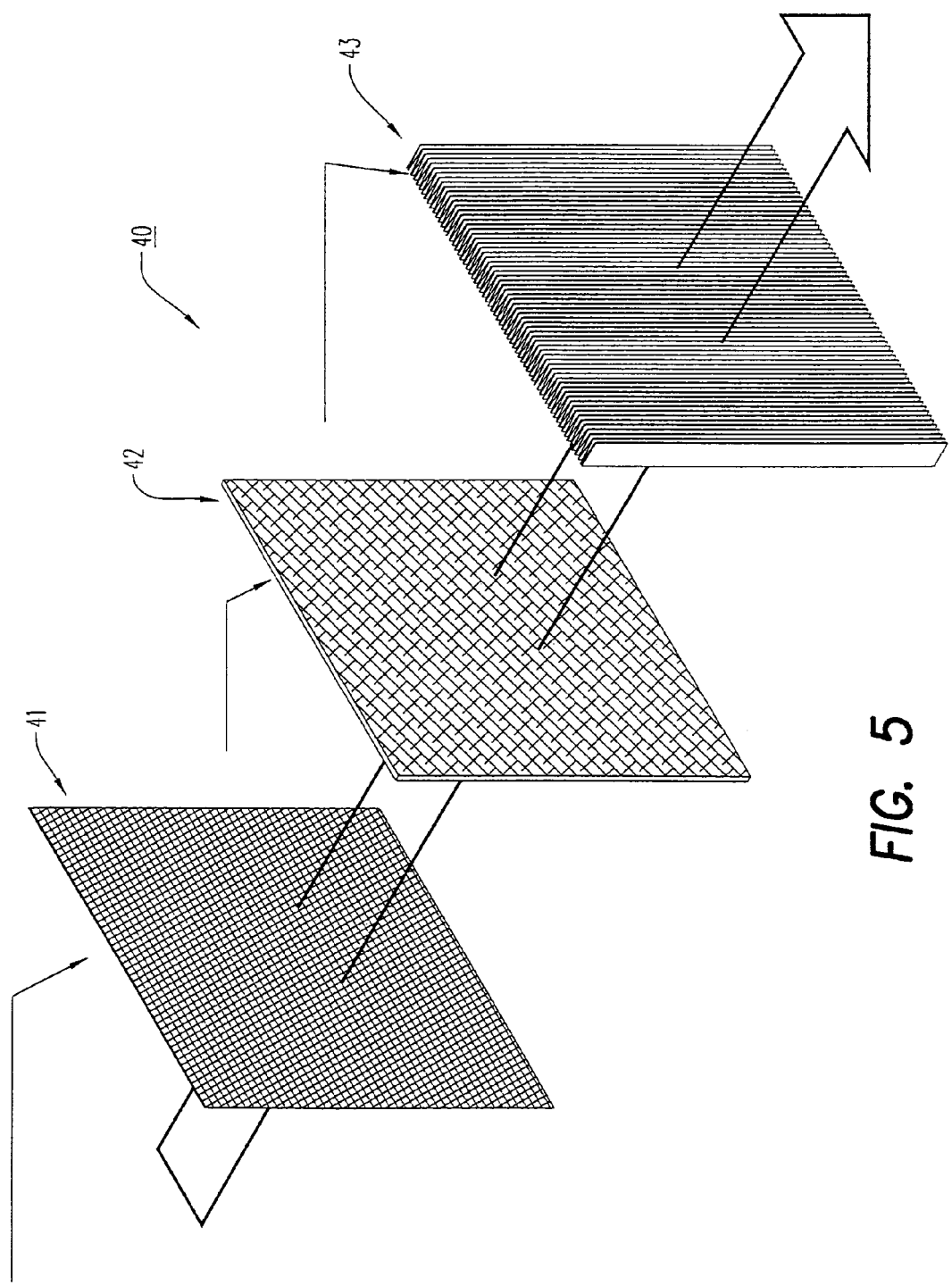
FIG. 5 shows a preferred example of a high efficiency air filter suitable for use in the present preferred embodiment.

In the present embodiment, centrifugal fans are used as air-moving devices to cause air movement along the two enclosed air-compartments as well as drawing air from the outside through the filter (40). Other comparable air-moving devices, for example, propeller, centrifugal fans and rotary vane wheels can also be used. The preferred air filter (40) used in this embodiment and as shown in FIG. 5 includes a multi-layer filter element which comprises a first layer of mesh or grid filter (41), a second layer (42) of an activated carbon filter and a third layer (43) of HEPA filter. The first filter layer (41) is for filtering larger particulate pollutants. The second layer (42) of activated carbon provides means to absorb odors and can also include other chemical absorptive agents or biostats such as potassium permanganate. To provide for easy cleaning, maintenance and replacement of the individual constituting filter elements, it is preferred that the filter (40) is made or assembled in a modular form so that each individual constituting filter elements as well as the complete filter assembly can be removed or replaced as and when necessary. The use of a modular design enables filters having differing operating life to be cleaned and/or replaced at different time intervals to attain optimal air filtering.

Figure 6:
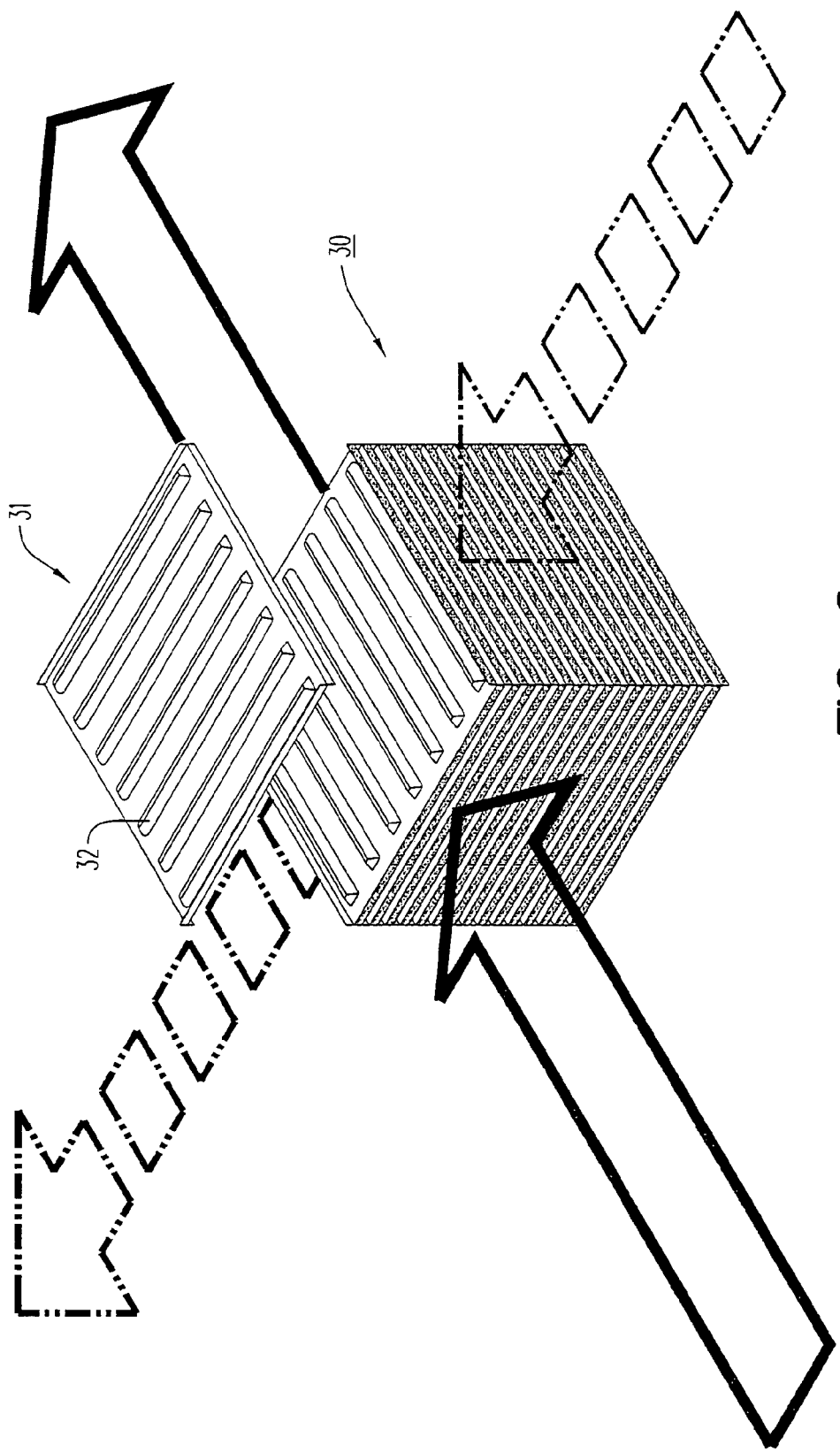
FIG. 6 illustrates in more detail a preferred thermal exchanger made of aluminium foils and the air-flow paths in the thermal exchanger of the air-ventilator of FIG. 1.

Turning now to a preferred example of a thermal exchanger which can be used in the present preferred embodiment, the thermal exchanger unit (30) shown in FIG. 6 includes an assembly of parallelly stacked thermal exchanger elements (32) which are generally thin metallic sheets, plates or foils, such as aluminium sheets or foils. Thin metallic sheets or foils are preferred because their high thermal conductivity offers high thermal transfer rate and their small thickness offers high thermal sensitivity. These characteristics together offer a high thermal efficiency. The thermal exchanger elements (32) are preformed with spacers which are in the form of parallel ribs (32) distributed along the width of the element. Since thin metallic sheets, especially sheets made of aluminium or aluminium alloys, are substantially semi-rigid, the ribs (32) can be formed by pressing. At the same time of the formation of the protruding ribs, corresponding grooves are formed on the other side of the ribs, thereby providing maximized air-flow space for a given volume of heat exchanger (30). The spacers are generally provided to separate and support adjacent elements or sheets, and at the same time maintaining a separation between adjacent elements to form a sub-channel for air passage.

Each of the thermal elements (31) is substantially square with two of the opposite ends upwardly bent at about 90°, forming a pair of opposing walls which extend upwardly from the ends. The remaining two opposite ends are downwardly bent at about 90°, forming another pair of opposing walls which extend at a direction opposite to that of the other pair. The thermal exchanger unit (30) is formed by stacking the metallic sheet elements (31) together and then by sealing and joining the adjacent and contiguous walls. The thermal exchanger sheets are stacked in the manner so that the bottom edge of the downwardly extending edges are aligned with the upwardly extending edges of the lower sheet element so that the downward edges are aligned and touching with the upward edges of the next lower element and vice versa.

By sealing and joining the contiguous downwardly and upwardly extending walls along two of the opposing edges, a confined air channel having an air-inlet and an air-out on the opposite sides of the metallic sheet as shown in FIG. 6 is formed, with the sealed edges defining the side transversal boundary of the confined air channel. By stacking the metallic sheets in the afore-mentioned alternate manner in which the ribs on the adjacent elements extend in substantially perpendicular directions, air channels having substantially perpendicular directions are formed.

Figure 7:
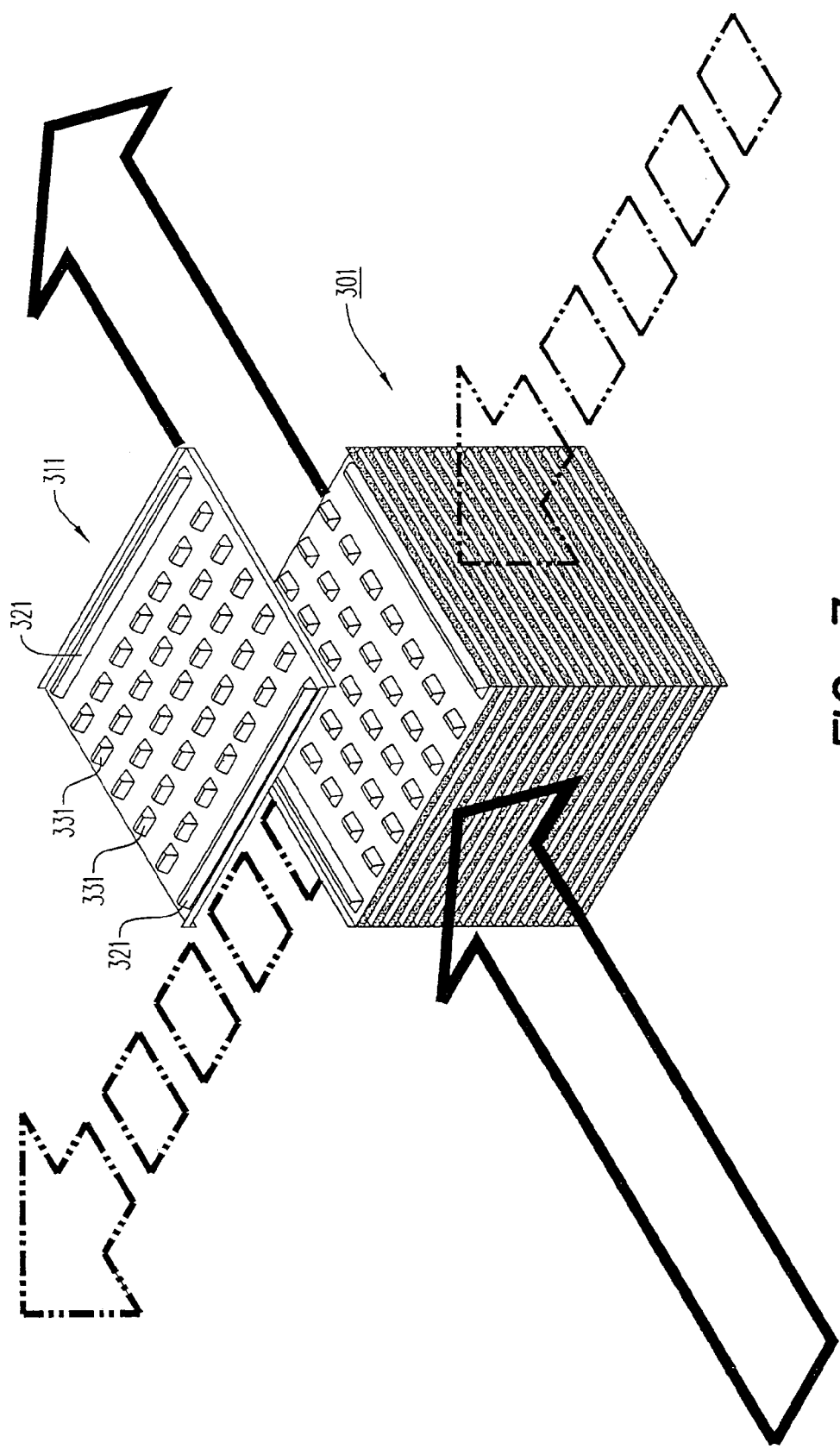
FIG. 7 shows a second preferred thermal exchanger made of aluminium foils and the air-flow paths in the thermal exchanger of the air-ventilator of FIG. 1.

FIG. 7 shows a second preferred embodiment of a thermal exchanger (301) which may also be used in and with the present air-ventilator (1). Similar to the embodiment of FIG. 6, the thermal exchanger (301) is assembled from a stack of thin metallic sheets or plates (301). Each of the metallic sheets (301) includes a pair of ridges (321) which run along the edges of the metallic plates, thereby defining the boundary of the air channels formed between adjacent thermal exchanging sheets. To disperse the flow of air through the defined channels, a plurality of protrusions are formed on at least one surface of the plates (301).

Similar to the last embodiment, air channels of different orientation can be formed by alternately stacking the adjacent thermal exchanging plates so that the ridges (321) are substantially perpendicular to each other.

In these arrangements, air streams moving in different directions can pass through the thermal exchanger without mixing occurring. By parallelly stacking a plurality of identically shaped metal sheets in the alternate configuration as shown in FIG. 6, a thermal exchanger having two separate air-flow paths which intersect without mixing is therefore formed. Furthermore, the multi-layer structure in FIG. 6 enables an air-stream to be split into a plurality of sub-channels to increase the effective contact area, thereby increasing the total thermal contact area and hence the thermal transfer efficiency.

Figure 2:
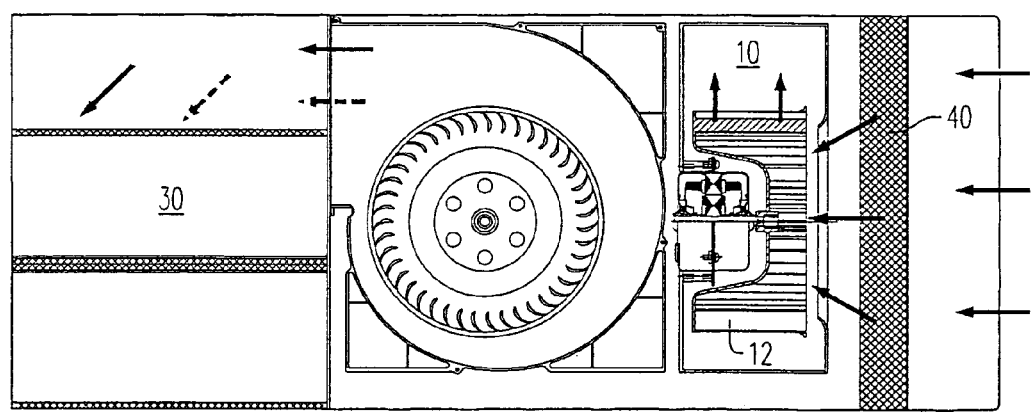
FIG. 2 is a top view of the air-ventilator of FIG. 1.
Figure 3:
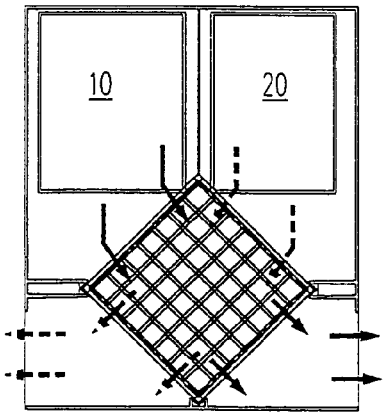
FIG. 3 is a schematic diagram showing the air-flow paths of the air-ventilator of FIG. 1 with particular illustration showing the thermal exchanger.
Figure 4:
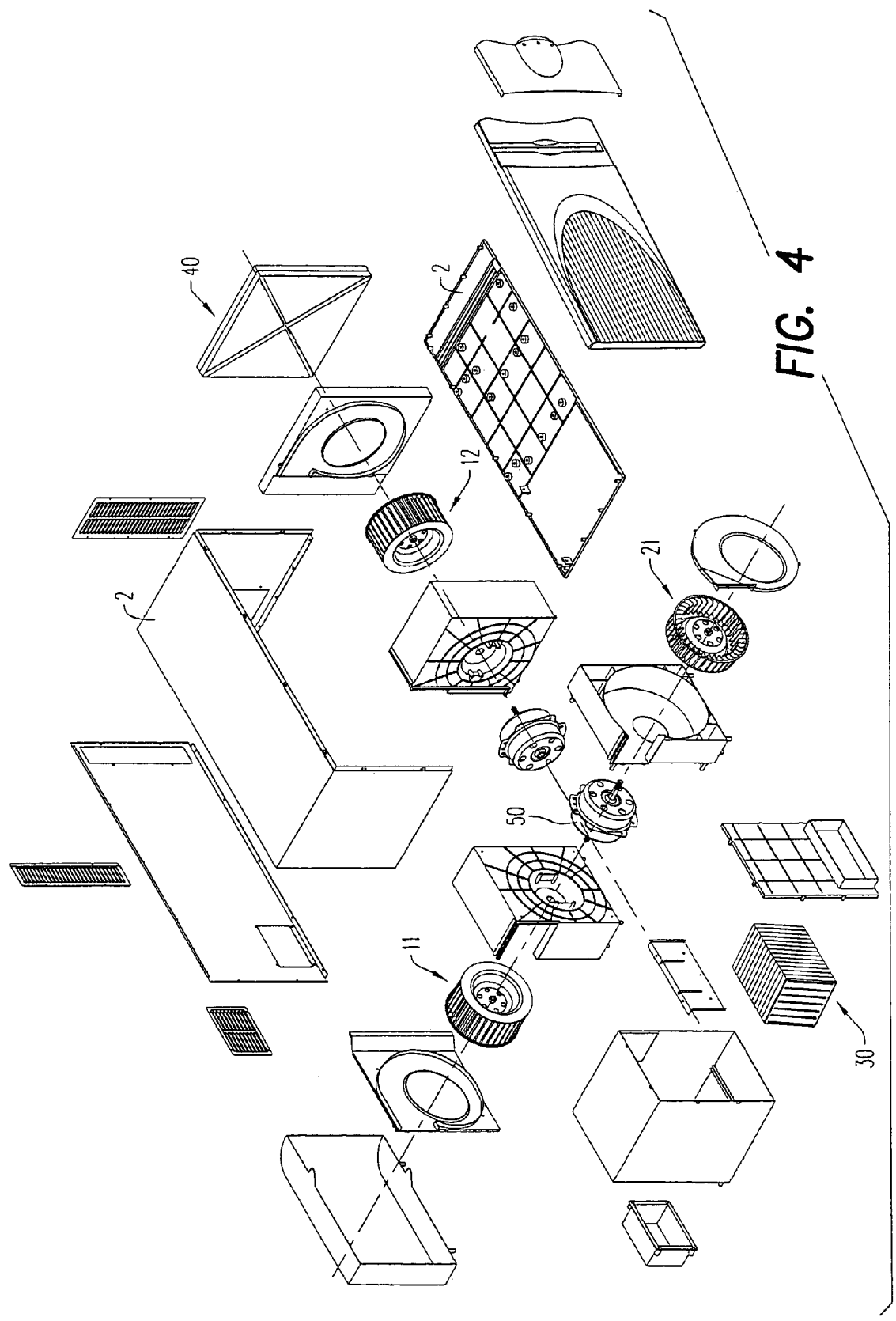
FIG. 4 is an exploded view of the air-ventilator of FIG. 1.

By installing the thermal exchanger within the main housing (2) in a manner so that one of the air-channel inlet of the thermal exchanger (30) is connected to the fresh-air compartment (10) and the other air-channel inlet is connected to the exhaust air compartment (20), thermal exchange between the incoming fresh air and the outgoing stale air can occur without mixing. Referring to FIGS. 1 and 2, the air-streams after thermal exchange will be directed to their respective designated directions, namely, fresh air is directed towards the enclosed space and the exhaust air is directed out of the enclosed space.

Because of the use of thin and light metallic sheets, such as aluminium or aluminium alloys, to assemble the thermal exchanger, the thermal exchanger generally has a very light weight, simple structure and can be made at a low cost. Also, because of its simple structure, the thermal exchanger can be replaced at low costs and relatively easily after the ventilator has been used for a long time. Preferably, the entire thermal exchanger unit (30) is made as a removable module for easy maintenance and simple replacement so that a high thermal exchange efficiency can be maintained by constant and regular replacement of the exchanger unit. For example, the thermal exchanger unit can be assembled within a frame or a cage so that the whole unit can be removed or replaced easily. Also, degradation in performance due to prolonged exposure to the pollutants containing air-streams which may cause adverse deposit on the surfaces or surface condition degradation may be minimized.

While an example of a preferred thermal exchanger has been explained in the present embodiment, it would be appreciated that other suitable forms of thermal exchangers can also be utilised in the present invention. For example, while the example thermal exchanger is formed by stacking a plurality of substantially rectangular metallic sheets, it would be obvious to persons skilled in the art to use metallic sheets of different shapes or different materials while achieving substantially the same result. In summary, an improved air-ventilator having means to alleviate the difficulties associated with conventional air-ventilators having in combination a high efficiency air filter and a thermal exchanger unit has been described in the present invention.

Furthermore, although the present invention has been described by reference to a stand alone air-ventilator, the present invention can also be incorporated in an air-conditioner to improve thermal efficiency. For example, the fresh air can, after thermal exchange, be passed on to the cooling or heating unit for further conditioning.

As regards the inclusion of an additional air-moving device to assist the air-moving device in the fresh-air compartment to alleviate the afore-mentioned problems, a centrifugal fan with its axis of rotation aligned towards the direction of the in-coming air and placed adjacent to the air filter has been described. It will be appreciated that other forms of air-moving devices, including propeller or other rotary fans can be used and the air-moving device can be placed in some other places along the fresh-air compartment and in different orientations without loss of generality. Furthermore, while the present invention has been explained with reference to the preferred embodiment described above, it would be appreciated by the present skill in the art that trivial modifications and variations can be utilised to realise the concept disclosed in the present invention without departing from the scope and spirit of the present invention.

What is claimed is:

1. An air-ventilator comprising: a main housing, having first and second air-compartments along which first and second air streams respectively flow during operation, first and second air-moving devices respectively disposed in said first and second air-compartments for moving said first and second air streams respectively along said first and second air-compartments during operation, a thermal exchanger providing thermal exchange between said first and second air streams without mixing of said air streams, an air filter disposed at the upstream end of said first air-compartment, and a centrifugal fan disposed in said first air-compartment in series with said first air-moving device, adjacent said air filter and intermediate said thermal exchanger and said air filter, to provide additional suction power to move additional air from said air filter towards said thermal exchanger whereby loss in air flow due to clogging or partial clogging of said air filter is compensated, said centrifugal fan comprising deflection means to deflect said first air stream whereby said first air stream undergoes a substantially orthogonal deflection upon transit through said centrifugal fan, and said first air compartment comprising means for further deflecting the first air stream after exit from said centrifugal fan and before reaching said first air-moving device, the further deflection by said first air compartment being also substantially orthogonal and directing said first air stream towards said first air-moving device.

2. An air-ventilator comprising: a main housing, first and second air-compartments, first and second air-moving devices respectively disposed in said first and second air-compartments for moving first and second air streams respectively along said first and second air-compartments during use, a thermal exchanger adapted for thermal exchange between said first and second air streams without mixing of said air streams, an air filter disposed at the upstream end of first air-compartment, and an additional air-moving device in series with said first air-moving device, the additional air-moving device being disposed in said first air-compartment and intermediate said thermal exchanger and said air filter, the additional air-moving device being adapted to provide additional power to move air from said air filter towards said thermal exchanger, wherein said additional air-moving device includes means to substantially change the direction of flow of said first air stream when moving through it, said first and second air-moving devices share a common rotational shaft, and the shaft of said additional air-moving device is substantially orthogonal to said common rotational shaft.

3. An air-ventilator according to claim 2, wherein said first, said second and said additional air-moving devices are disposed intermediate of said air filter and said thermal exchanger.

4. An air-ventilator according to claim 3, wherein said thermal exchanger is disposed at the downstream ends of said first and second air-compartments, and the upstream end of said thermal exchanger is generally opposite said air filter.

* * * * *